(12) United States Patent
Biskup et al.

(10) Patent No.: US 11,658,563 B2
(45) Date of Patent: May 23, 2023

(54) HALF-BRIDGE POWER SUPPLY WITH DYNAMIC DEAD TIME

(71) Applicant: Atieva, Inc., Newark, CA (US)

(72) Inventors: Richard J. Biskup, Sunnyvale, CA (US); Miaosen Shen, Fremont, CA (US)

(73) Assignee: Atieva, Inc., Newark, CA (US)

( * ) Notice: Subject to any disclaimer, the term of this patent is extended or adjusted under 35 U.S.C. 154(b) by 0 days.

(21) Appl. No.: 17/304,149

(22) Filed: Jun. 15, 2021

(65) Prior Publication Data

US 2022/0399805 A1 Dec. 15, 2022

(51) Int. Cl.
*H02M 1/38* (2007.01)
*H02M 1/00* (2006.01)
*H02M 7/5387* (2007.01)
*H02P 27/08* (2006.01)

(52) U.S. Cl.
CPC .......... *H02M 1/38* (2013.01); *H02M 1/0054* (2021.05); *H02M 7/53871* (2013.01); *H02P 27/08* (2013.01)

(58) Field of Classification Search
CPC .......... H02P 27/00; H02P 27/04; H02P 27/06; H02P 27/08; H02P 27/085; H02P 27/16; H02P 25/00; H02P 25/022; H02P 25/03; H02P 25/032; H02P 25/034; H02P 25/062; H02P 25/064; H02P 25/066; H02P 25/083; H02P 25/086; H02P 25/089; H02P 25/092; H02P 25/0925; H02P 25/10; H02P 25/102; H02P 25/107; H02P 25/18; H02P 21/00; H02P 21/22; H02P 21/34; H02P 23/00; H02P 23/28; H02P 6/00; H02P 6/005; H02P 6/085; H02P 6/12; H02P 6/14; H02P 6/28; H02P 6/32; H02P 7/00; H02P 7/29; H02P 7/292; H02P 3/00; H02P 1/00; H02P 1/04; H02P 1/16; H02P 1/18; H02P 1/42
See application file for complete search history.

(56) References Cited

U.S. PATENT DOCUMENTS

| | | | |
|---|---|---|---|
| 6,100,645 A | 8/2000 | Moisin | |
| 7,508,175 B2 | 3/2009 | Dewitt et al. | |
| 7,714,624 B2 * | 5/2010 | Takasu | H02M 3/1582 327/423 |
| 8,350,549 B2 | 1/2013 | Kitabatake | |
| 8,587,279 B2 * | 11/2013 | Wang | H03K 17/162 323/283 |

(Continued)

FOREIGN PATENT DOCUMENTS

WO 2018194673 A1 10/2018

OTHER PUBLICATIONS

International Search Report and Written Opinion for PCT Application No. PCT/US2022/072959, dated Sep. 3, 2022, 9 pages.

*Primary Examiner* — Antony M Paul
(74) *Attorney, Agent, or Firm* — Brake Hughes Bellermann LLP

(57) ABSTRACT

A half-bridge power supply comprises: a first switch electrically connected to an energy source and to a load; a second switch electrically connected to the energy source and to the load; and circuitry electrically connected to the first and second switches and configured to provide a dynamic dead time for the half-bridge power supply based on one of the first and second switches being turned off having forward current.

19 Claims, 5 Drawing Sheets

(56) References Cited

U.S. PATENT DOCUMENTS

| | | |
|---|---|---|
| 8,693,226 B2 | 4/2014 | Kitabatake et al. |
| 8,735,968 B2 | 5/2014 | Li et al. |
| 8,791,744 B2 | 7/2014 | Takimoto et al. |
| 9,407,189 B2 | 8/2016 | Tang |
| 10,224,722 B2 | 3/2019 | Hopperdietzel |
| 10,293,705 B2 | 5/2019 | Lee et al. |
| 10,447,195 B2 | 10/2019 | Tang |
| 10,644,601 B2 | 5/2020 | Pao et al. |
| 2006/0189011 A1 | 8/2006 | Takahashi et al. |
| 2014/0266325 A1 | 9/2014 | Tang et al. |
| 2015/0028785 A1 | 1/2015 | Tang |
| 2016/0336733 A1 | 11/2016 | Li |
| 2020/0099240 A1 | 3/2020 | Platonov |
| 2021/0143731 A1 | 5/2021 | Ji et al. |

\* cited by examiner

US 11,658,563 B2

HALF-BRIDGE POWER SUPPLY WITH DYNAMIC DEAD TIME

TECHNICAL FIELD

This document relates to a half-bridge power supply with dynamic dead time.

BACKGROUND

A half-bridge converter has two switches typically controlled by a pulse width modulation (PWM) scheme. In prior approaches, a fixed OFF time (also known as a dead time) has been applied to the two switch positions. This value has been determined experimentally, and is a compromise between reliability and power loss. If the fixed dead time is set too short, the half bridge will experience an effect known as shoot-through, where the conduction state of both switches overlap. This increases power loss and can destroy the output stage. If the fixed dead time is set too long, the power loss will increase and there will be a reduction or distortion in the desired output voltage.

Some prior approaches have attempted to reduce power losses by controlling the PWM scheme entirely within hardware using the gate driver. In such attempts, the output circuit monitors for the voltage to transition in order to set the dead time. However, these approaches may be costly to implement and may not realize the full potential of the power loss reduction.

SUMMARY

In a first aspect, a half-bridge power supply comprises: a first switch electrically connected to an energy source and to a load; a second switch electrically connected to the energy source and to the load; and circuitry electrically connected to the first and second switches and configured to provide a dynamic dead time for the half-bridge power supply based on one of the first and second switches being turned off having forward current.

Implementations can include any or all of the following features. At least one of the first and second switches comprises a silicon carbide MOSFET. At least one of the first and second switches comprises an IGBT. At least one of the first and second switches comprises a silicon MOSFET. The half-bridge power supply comprises an inverter. The half-bridge power supply further comprises a controller electrically connected to the circuitry, the controller including a first processor. The circuitry comprises a logic circuit electrically connected to the controller. The logic circuit comprises a field-programmable gate array. The circuitry comprises a second processor executing software, wherein the software defines the dynamic dead time. The second processor is the first processor. The circuitry is configured to obtain the dynamic dead time from a lookup table. The lookup table includes different dynamic dead times associated with respective voltages and currents. The circuitry is configured to obtain the dynamic dead time using a polynomial based on at least current. The circuitry is configured to provide the dynamic dead time by controlling a pulse width modulation scheme for the first and second switches. The circuitry is configured to provide a fixed dead time for the half-bridge power supply based on the one of the first and second switches being turned off having reverse current.

In a second aspect, a half-bridge power supply comprises: a first switch electrically connected to an energy source and to a load; a second switch electrically connected to the energy source and to the load; and means for providing a dynamic dead time for the half-bridge power supply based on one of the first and second switches being turned off having forward current.

In a third aspect, a system comprising: an energy source; a motor; and a first half-bridge, the first half-bridge comprising: a first switch electrically connected to the energy source and to the motor; a second switch electrically connected to the energy source and to the motor; and first circuitry electrically connected to the first and second switches and configured to provide a dynamic dead time for the first half-bridge based on one of the first and second switches being turned off having forward current.

Implementations can include any or all of the following features. The motor includes a first phase winding, a second phase winding, and a third phase winding, wherein the first half-bridge is electrically connected to the first phase winding, the system further comprising: a second half-bridge, the second half-bridge electrically connected to the second phase winding and comprising: a third switch electrically connected to the energy source and to the motor; a fourth switch electrically connected to the energy source and to the motor; and second circuitry electrically connected to the third and fourth switches and configured to provide a dynamic dead time for the second half-bridge based on one of the third and fourth switches being turned off having forward current; and a third half-bridge, the third half-bridge electrically connected to the third phase winding and comprising: a fifth switch electrically connected to the energy source and to the motor; a sixth switch electrically connected to the energy source and to the motor; and third circuitry electrically connected to the fifth and sixth switches and configured to provide a dynamic dead time for the third half-bridge based on one of the fifth and sixth switches being turned off having forward current. The first, second, and third circuitries are included in a common logic circuit. The first, second, and third circuitries are formed by a processor executing software.

BRIEF DESCRIPTION OF DRAWINGS

Like reference symbols in the various drawings indicate like elements.

DETAILED DESCRIPTION

Figure 1:
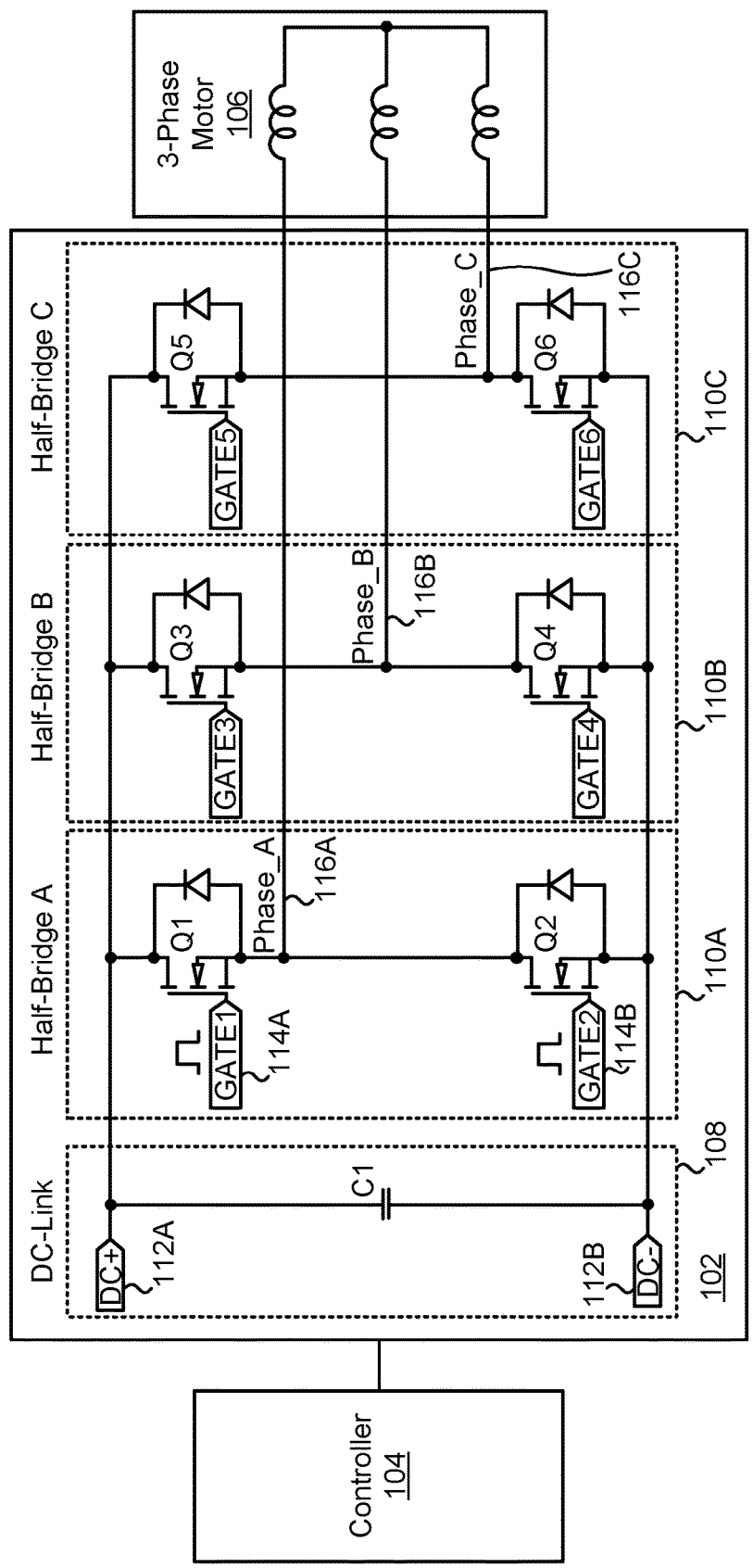
FIG. 1 shows an example of a system with a power stage that can use a dynamic dead time.

This document describes examples of systems and techniques for providing dynamic dead time to a power stage that uses one or more half bridges (e.g., a power converter). Such approaches can reduce power losses that would otherwise occur in the half bridge(s). In some implementations, the power stage can form an inverter of an electric machine, including, but not limited to, in a drive unit of an electric vehicle (e.g., a fully electric vehicle or the electric motor of a hybrid vehicle). For example, by reducing switching losses, the present subject matter can increase the available driving range for an electric vehicle without increasing the size of the energy storage (e.g., a battery pack). The inverter can operate at a range of successive power levels. The direction of the current changes regularly during operation. At every point in the operating waveform of an inverter, there may be an optimal length of a dead time in terms of managing its performance and reducing losses. The present subject matter can apply dynamic dead times corresponding to one or more aspects of the operating waveform.

The techniques described herein can be implemented so as to reduce losses at a significant number of the switching operations performed in the power stage. In some implementations, dynamic dead time can be applied in a switching scheme substantially in every situation where the switch that is being turned off has forward current. For example, this involves about fifty percent of the switching events in the power stage. As such, reduction of power loss can be realized in each of a substantial share of all operations performed by the power stage.

Dead times that are not dynamically controlled can be fixed dead times. In some implementations, hard-switching events can be set to shorter dead times (i.e., shorter fixed dead times) than what would be used for minimizing power loss without the dynamic dead times provided by the present disclosure. For example, in order to obtain the best overall efficiency, the fixed dead times may otherwise have been set long enough to achieve some soft switching, but not so long as to generate too much losses in the body diode(s) of the switch(es). Here, in contrast, the occurrence of soft switching can be ensured by way of providing dynamic dead times in substantially all switching situations where the system is not in a steady state.

The present subject matter can be implemented at relatively low cost. For example, a logic circuit that is already implemented for another purpose with regard to a power stage can also be used to provide dynamic dead times for controlling the switches. As another example, a controller (e.g., one or more processors) that is already implemented for another purpose with regard to a power stage can also be programmed to provide dynamic dead times.

Examples herein refer to a power stage. As used herein, a power stage includes two or more switches and can perform power conversion from an input voltage to an output voltage by way of one or more forms of switching events. A power stage can provide conversion of electric energy from one form to another form that is tailored to the specific load(s) being driven by the power stage. For example, a power stage can perform conversion from direct current (DC) to alternating current (AC). As another example, a power stage can perform DC-to-DC conversion. In some implementations, a power stage can be a buck converter. In some implementations, a power stage can be an inverter. In some implementations, a power stage can serve as a power supply. For example, the power supply can operate to produce a non-constant output current.

Examples herein refer to a switch. As used herein, a switch is an electrical component that can connect or disconnect two or more conducting paths in an electrical circuit. For example, the switch can interrupt the current or allow the current to flow, based on the setting of the switch. In some implementations, a switch can include one or more semiconductor devices. For example, a switch can include a transistor. In some implementations, a switch includes a metal-oxide-semiconductor field-effect transistor (MOSFET). For example, a switch can include a silicon-carbide MOSFET. As another example, a switch can include a silicon MOSFET. In some implementations, a switch includes an insulated-gate bipolar transistor (IGBT). Other switches can be used.

Examples herein mention circuitry that can provide a dynamic dead time for a half-bridge power supply. As used herein, circuitry includes one or more electronic circuits configured to perform one or more operations. In some implementations, circuitry can include a logic circuit of multiple devices. Such devices can include, but are not limited to logic gates (e.g., gates that implement one or more of logical NOT, AND, OR, NOT-AND (NAND), NOT-OR (NOR), or exclusive-OR (XOR) operations), and/or flip-flops. In some implementations, circuitry can include a discrete circuit. In some implementations, circuitry can include an integrated circuit. For example, circuitry can include a field-programmable gate array (FPGA). A circuit can include a processor (e.g., a general-purpose processor or a special-purpose processor) that is configured for reading and executing instructions stored in software. As used herein, software includes, but is not limited to, firmware.

Examples herein refer to a vehicle. A vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle.

FIG. 1 shows an example of a system 100 with a power stage 102 that can use a dynamic dead time. The system 100 and/or the power stage 102 can be used with one or more other examples described elsewhere herein. The system includes a controller 104 electrically coupled to the power stage 102. The system 100 includes a load 106. In some implementations, the load 106 includes an electric motor, wherein the controller 104 causes the power stage 102 to drive the electric motor. The load 106 can be a multi-phase (e.g., three-phase) electric motor, to name just one example.

The controller 104 is configured for providing a dynamic dead time to the power stage 102 based on a direction of current the power stage 102. In some implementations, the controller 104 can be configured to detect the direction of current, and the magnitude of current and/or voltage, in the power stage 102. For example, the controller 104 can define the PWM scheme that is to be used for operating the power stage 102, including the dynamic dead time(s). As another example, the controller 104 can receive PWM signals comprising fixed dead times, and can manipulate the PWM signals to generate the dynamic dead times for at least some of the switching events. The controller 104 can include a processor executing instructions stored in software, or can include a logic circuit (e.g., an FPGA), to name just two examples.

The power stage 102 here includes a DC-link portion 108, and half-bridge power stages 110A, 110B, and 110C, respectively. The DC-link portion 108 can include DC terminals 112A-112B (e.g., a positive terminal (DC+) and a negative terminal (DC−)), and a capacitor C1 electrically connected between the DC terminals 112A-112B. In some implementations, the DC terminals 112A-112B are electrically connected to an energy source (e.g., a battery pack of one or more battery modules). For example, the energy source can include electrochemical cells (e.g., lithium-ion cells).

Each of the half-bridge power stages 110A-110C can include switches and one or more other components. Here, the half-bridge power stage 110A includes switches Q1 and Q2, respectively. A drain of the switch Q1 is electrically connected to the DC terminal 112A. A source of the switch Q1 is electrically connected to the drain of the switch Q2. A gate of the switch Q1 is electrically connected to a gate driver 114A. In some implementations, the gate driver 114A can be electrically connected to the controller 104. For example, the controller 104 provides a PWM signal to the switch Q1 by way of the gate driver 114A. The drain, source, and gate of the switch Q1 can form the channel of the switch Q1. The switch Q1 here also includes a body diode that is electrically connected to the drain and the source of the switch Q1.

A source of the switch Q2 is electrically connected to the DC terminal 112B. A drain of the switch Q2 is electrically connected to the source of the switch Q1. A gate of the switch Q2 is electrically connected to a gate driver 114B. In some implementations, the gate driver 114B can be electrically connected to the controller 104. For example, the controller 104 provides a PWM signal to the switch Q2 by way of the gate driver 114B. The drain, source, and gate of the switch Q2 can form the channel of the switch Q2. The switch Q2 here also includes a body diode that is electrically connected to the drain and the source of the switch Q2.

Here, the half-bridge power stage 110B includes switches Q3 and Q4, respectively. The switches Q3 and Q4 can be electrically connected similarly to the switches Q1 and Q2, respectively. For example, a gate driver of the switch Q3 or Q4 can implement a different PWM scheme than the gate drivers 114A-114B, respectively.

Here, the half-bridge power stage 110C includes switches Q5 and Q6, respectively. The switches Q5 and Q6 can be electrically connected similarly to the switches Q1 and Q2, respectively. For example, a gate driver of the switch Q5 or Q6 can implement a different PWM scheme than the gate drivers 114A-114B, respectively.

In these examples, the switches Q1-Q6 are shown as MOSFETS for illustrative purposes only.

The half-bridge power stages 110A-110C can be associated with respective phases of the load 106. In some implementations, a winding 116A connects the half-bridge power stage 110A and the load 106 to each other. The winding 116A can be connected to the source of the switch Q1 and to the drain of the switch Q2. For example, the winding 116A can be referred to as Phase A of the load 106. In some implementations, a winding 116B connects the half-bridge power stage 110B and the load 106 to each other. The winding 116B can be connected to the source of the switch Q3 and to the drain of the switch Q4. For example, the winding 116B can be referred to as Phase B of the load 106. In some implementations, a winding 116C connects the half-bridge power stage 110C and the load 106 to each other. The winding 116C can be connected to the source of the switch Q5 and to the drain of the switch Q6. For example, the winding 116C can be referred to as Phase C of the load 106.

Figure 2:
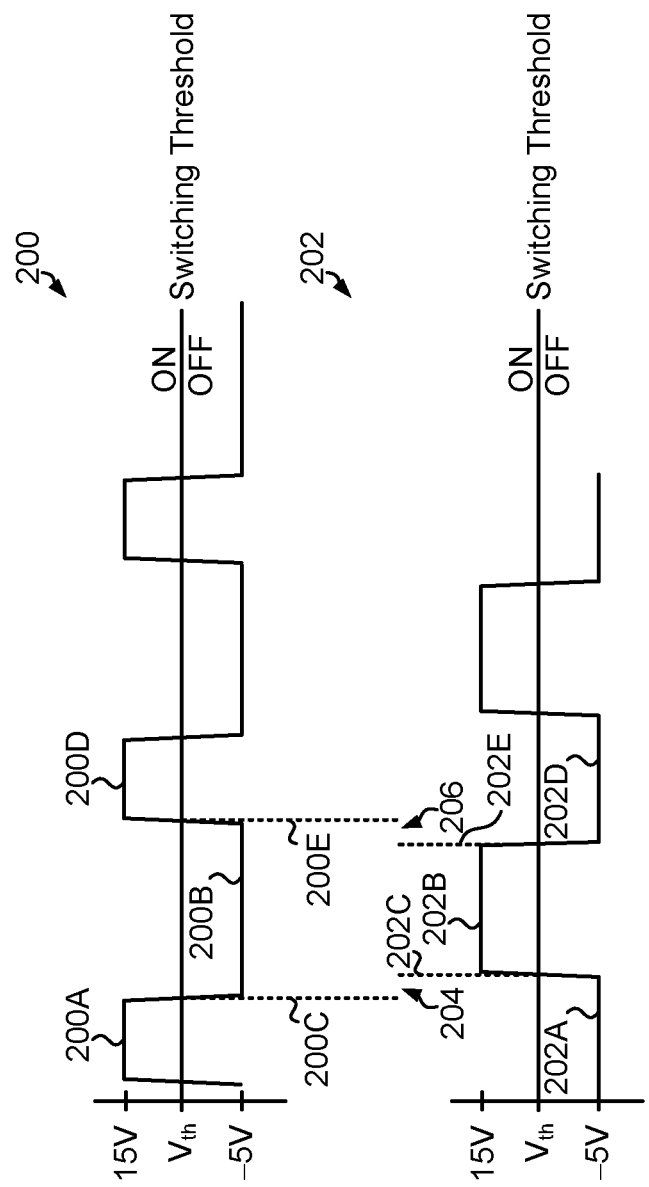
FIG. 2 shows examples of PWM schemes.

FIG. 2 shows examples of PWM schemes 200 and 202. The PWM schemes 200 and 202 can be used with one or more other examples described elsewhere herein. With reference to the power stage 102 (FIG. 1), the PWM scheme 200 can be used to control the switch Q1. For example, the PWM scheme 200 can be applied to the gate driver 114A. The PWM scheme 202 can be used to control the switch Q2. For example, the PWM scheme 202 can be applied to the gate driver 114B.

Each of the PWM schemes 200 and 202 is illustrated as a signal (e.g., a waveform) shown in relation to a coordinate system. Time is indicated with reference to the horizontal axis. Voltage of the PWM signal is indicated with reference to the vertical axis (e.g., in volts). Here, respective voltages of 15V and −5V are indicated for illustrative purposes only. Any of a range of suitable voltages can be used for controlling the switches Q1 and Q2, respectively. A switching threshold ($V_{th}$) is illustrated as an example. For example, the switching threshold can indicate the voltage at which the switch transitions between respective ON and OFF states.

Each of the PWM schemes 200 and 202 includes a series of voltage transitions reflecting respective ON and OFF states of the respective switch. The PWM scheme 200 here includes an ON state 200A (e.g., when the switch Q1 is ON) that is followed by an OFF state 200B (e.g., when the switch Q1 is OFF). The transition from the ON state 200A to the OFF state 200B is here marked with a boundary 200C. The PWM scheme 202 here includes an OFF state 202A (e.g., when the switch Q2 is OFF) that is followed by an ON state 202B (e.g., when the switch Q2 is ON). The transition from the OFF state 202A to the ON state 202B is here marked with a boundary 202C. The boundaries 200C and 202C here define one instance when both the switches Q1 and Q2 are OFF. This interval in time is here referred to as a dead time 204. For example, the dead time 204 corresponds to a time after the switch Q1 has been turned OFF and before the switch Q2 is turned ON.

The PWM scheme 200 here includes an ON state 200D (e.g., when the switch Q1 is ON). The transition from the OFF state 200B to the ON state 200D is here marked with a boundary 200E. The PWM scheme 202 here includes an OFF state 202D (e.g., when the switch Q2 is OFF). The transition from the ON state 202B to the OFF state 202D is here marked with a boundary 202E. The boundaries 200E and 202E here define another instance when both the switches Q1 and Q2 are OFF. This interval in time is here referred to as a dead time 206. For example, the dead time 206 corresponds to a time after the switch Q2 has been turned OFF and before the switch Q1 is turned ON.

The PWM schemes 200 and 202 can form multiple dynamic dead times and multiple fixed dead times. In some implementations, whether to provide a dynamic dead time can be decided based at least in part on the direction of current flow relative to the respective switches. Below will first be described an example (FIGS. 3A-3B) where the direction of current flow indicates that a dynamic dead time should not be provided; accordingly, a fixed dead time can be provided. For example, the fixed dead time can be of a minimal duration that is sufficient to avoid a shoot-through event. Thereafter, there will be described an example (FIGS. 4A-4B) where the direction of current flow indicates that a dynamic dead time should be provided. For example, the dynamic dead time can have a duration determined based on the current and/or voltage of the power stage.

In each of the dead times 204 and 206, the power stage (e.g., the power stage 102 in FIG. 1) can exhibit different behavior depending on the direction of the current that is flowing when the particular one of the dead times 204 and 206 is to occur. Therefore, either of two different cases will occur at each one of the dead times 204 and 206. The behavior within each of the dead times 204 and 206 can be divided into respective cases 1 and 2 as in Table 1 below:

TABLE 1

| Event | Current Polarity | Dead Time Applied |
|---|---|---|
| Case 1 of the dead time 204 (occurring before switch Q2 is turned ON) | Out of the half-bridge power stage 110 A | Dynamic dead time |
| Case 2 of the dead time 204 (occurring before switch Q2 is turned ON) | Into the half-bridge power stage 110 A | Fixed minimal dead time |

TABLE 1-continued

| Event | Current Polarity | Dead Time Applied |
| --- | --- | --- |
| Case 1 of the dead time 206 (occurring before switch Q1 is turned ON) | Out of the half-bridge power stage 110 A | Fixed minimal dead time |
| Case 2 of the dead time 206 (occurring before switch Q1 is turned ON) | Into the half-bridge power stage 110 A | Dynamic dead time |

That is, Table 1 shows that the dead time 204 will be either a dynamic dead time (when the current is flowing out of the power stage at the time), or a fixed dead time (when the current is flowing into the power stage at the time). For the switch Q1, having the current flowing out of the power stage corresponds to a forward current. Accordingly, the dead time 204 will be a dynamic dead time based on the switch Q1 having forward current as the switch Q1 is being turned off.

Likewise, Table 1 shows that the dead time 206 will be either a fixed dead time (when the current is flowing out of the power stage at the time), or a dynamic dead time (when the current is flowing into the power stage at the time). For the switch Q2, having the current flowing into the power stage corresponds to a forward current. Accordingly, the dead time 206 will be a dynamic dead time based on the switch Q2 having forward current as the switch Q2 is being turned off.

Providing a dynamic dead time can reduce switching losses that would otherwise occur during the switching event. To illustrate how switching losses can be reduced, two of the above four scenarios will be used. Namely, case 1 and case 2 for the dead time 206 will be described below as examples of how the system can focus on the current flow in the half-bridge power stage in determining the dead time. That is, FIGS. 3A-3B correspond to case 1 of the dead time 206, and FIGS. 4A-4B correspond to case 2 of the dead time 206. By symmetry, the analysis of the switching events for the other two of the four scenarios—cases 1 and 2 for the dead time 204—is the same and will not be repeated in the following.

Figure 3B:
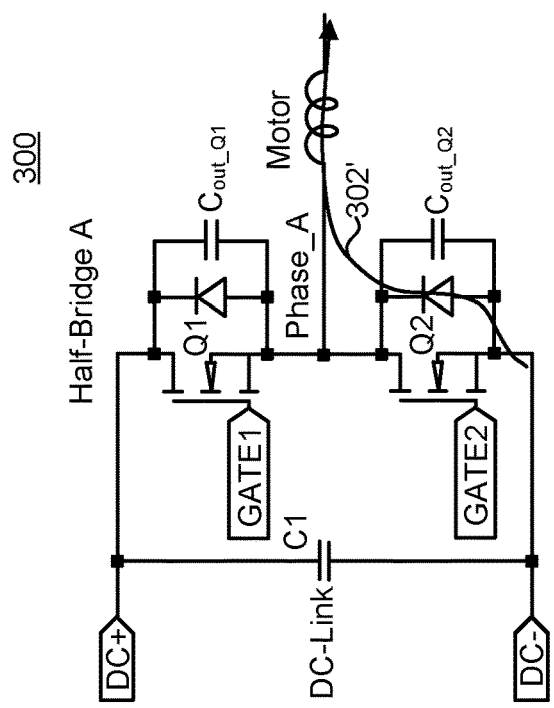
FIGS. 3A-3B show an example of a scenario where hard switching can be performed using a fixed dead time.
Figure 3A:
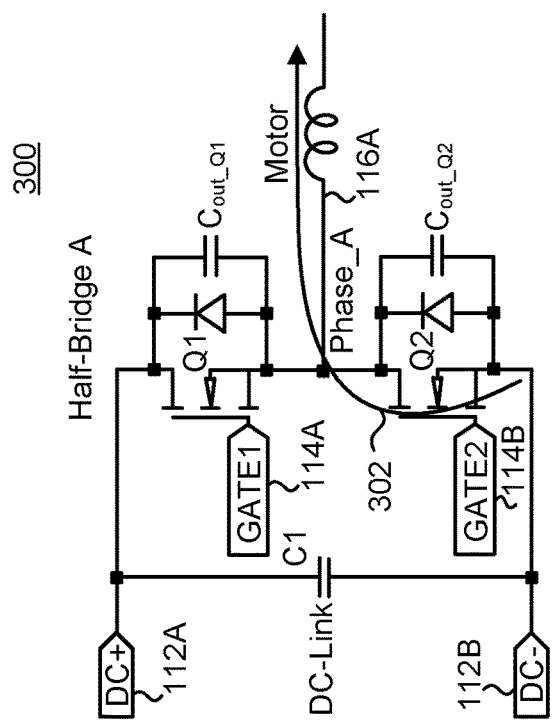

FIGS. 3A-3B show an example of a scenario where hard switching can be performed using a fixed dead time. The example is described with reference to a circuit 300, which can be used with one or more other examples described elsewhere herein. Components that have the same reference numbers as in FIG. 1 can be similar or identical to those components. These examples will be described in the context of an electric motor, solely for purposes of illustration.

The circuit 300 shows the parasitic output capacitances for each of the switches Q1 and Q2. The parasitic capacitances can occur due to the internal capacitance of any component of the circuit 300, and/or due to the proximity of components to each other. Namely, the switch Q1 has a capacitance $C_{out\_Q1}$ that is electrically connected to the drain and source of the switch Q1 in parallel with the body diode of the switch Q1. The switch Q2 has a capacitance $C_{out\_Q2}$ that is electrically connected to the drain and source of the switch Q2 in parallel with the body diode of the switch Q2. During operation of the circuit 300, some of the power loss depends on how the capacitances $C_{out\_Q1}$ and $C_{out\_Q2}$ are charged and discharged, for example as described in the following.

FIG. 3A shows the state of the circuit 300 while the switch Q1 is OFF and before the switch Q2 is turned OFF. With reference briefly to FIG. 2, this can correspond to the OFF state 200B for the switch Q1, and to the ON state 202B for the switch Q2. An arrow 302 schematically indicates that motor current flows from the DC terminal 112B through the channel of the switch Q2, out of the half-bridge, and into the winding 116A. At this moment, the capacitance $C_{out\_Q2}$ is fully discharged and $C_{out\_Q1}$ is charged up to the DC-Link voltage. When the switch Q2 turns OFF due to the signal at the gate driver 114B, the inductance of the motor forces the current to continue. Since the switch Q2 is now OFF, the current shifts from flowing through the channel of the switch Q2 to instead flowing through the body diode of the switch Q2, as schematically indicated in FIG. 3B by an arrow 302'.

At this point, the system is in a steady state, but the power dissipation is higher because the body diode of the switch Q2 has a higher voltage drop than the channel of the switch Q2. Essentially the entire output voltage, the current on the output, can remain at the same state of charge. Due to the steady state, there may not exist any benefit of extending the dead time beyond a minimal dead time.

The next event is to turn ON the switch Q1. To minimize power loss, the switch Q1 can be turned ON as soon as the switch Q2 transitions the current to the body diode of the switch Q2. This should be done after a fixed minimum dead time, consistent with avoiding shoot-through. When the switch Q1 turns ON, it will dissipate energy by charging the capacitance $C_{out\_Q2}$ of the switch Q2, and by simultaneously discharging its own capacitance $C_{out\_Q1}$, and by flowing current due to the reverse recovery of the body diode of the switch Q2. The capacitances $C_{out\_Q1}$ and $C_{out\_Q2}$ are effectively in parallel in the circuit 300. These losses due to the charging, discharging, and current flow are unavoidable, and this switching event can be referred to as a hard-switching event. In the present subject matter, the dead time for a hard-switching event can be set to a shorter dead time than what would otherwise have been used. Namely, in previous approaches, to obtain the best overall efficiency, the fixed dead time may have been set to be long enough that some soft-switching is achieved, but not so long that too much losses are incurred in the body diodes of the switches Q1 and Q2. Accordingly, a fixed minimal dead time can be applied in case 1 of the dead time 206, that is, when the current according to the arrow 302 is a reverse current for the switch Q2 that is being turned OFF.

Figure 4B:
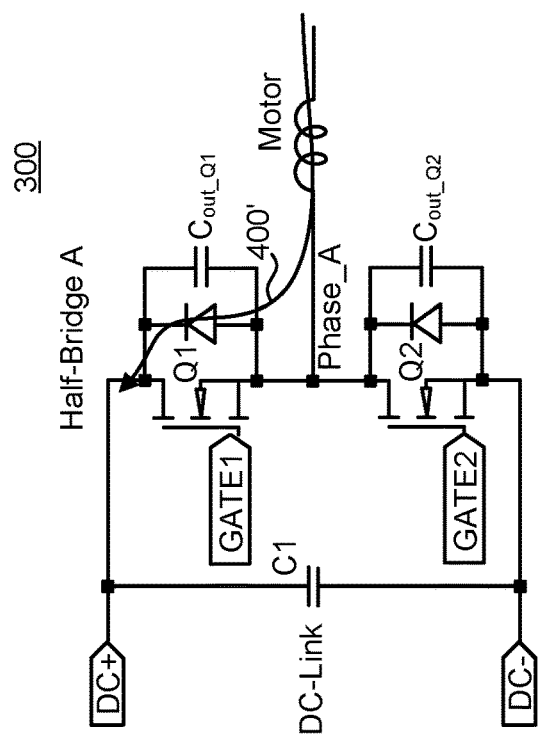
FIGS. 4A-4B show an example where soft switching can be performed using a dynamic dead time.
Figure 4A:
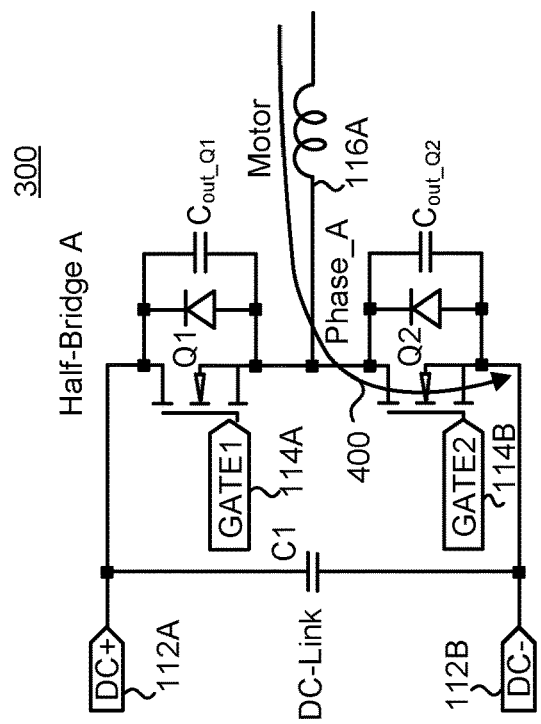

FIGS. 4A-4B show an example where soft switching can be performed using a dynamic dead time. The example is described with reference to the circuit 300, and components that have the same reference numbers as in FIGS. 3A-3B can be similar or identical to those components. These examples will be described in the context of an electric motor, solely for purposes of illustration.

FIGS. 4A-4B correspond to case 2 of the dead time 206. The circuit operation is different than in case 1 which was described above. Here, the current is flowing into the half bridge, as schematically indicated by an arrow 400, at the time when the switch Q2 is commanded to turn OFF. This time, the switch Q2 blocks the flow of current because the channel of the switch Q2 is cut off, and the body diode of the switch Q2 is reverse biased. Since the current in the inductance of the motor cannot change instantly, the current charges the capacitance $C_{out\_Q2}$ of the switch Q2, and simultaneously discharges the capacitance $C_{out\_Q1}$ of the switch Q1. As a result, the voltage rises on the winding 116A (e.g., the Phase_A node) until it reaches the value of the DC terminal 112A (e.g., DC+). When this charging and discharging is complete, the current begins to flow through the body diode of the switch Q1, as schematically indicated in FIG. 4B by an arrow 400'. Next, the switch Q1 can be turned ON to move the current off of the body diode of the switch Q1 and send it through the channel of the switch Q1. The energy to charge and discharge the capacitances $C_{out\_Q2}$ and $C_{out\_Q1}$, respectively, comes from the energy stored in an inductor (e.g., the motor windings). This results in lower energy loss than sending this current through the resistive element of the switch channel. The voltage across the switch Q1 can be zero when it is time to turn it ON, and this can be referred to as a soft-switching event.

The just-described process requires time to complete. The exact time depends on the amount of capacitance in the system (e.g., the capacitances $C_{out\_Q2}$ and $C_{out\_Q1}$ in the circuit 300), and the magnitude of the current that is flowing at the time of switching. For example, the capacitance of the system can also vary with the system voltage. Accordingly, a dynamic dead time can be applied in case 2 of the dead time 206, that is, when the current according to the arrow 400 is a forward current for the switch Q2 that is being turned OFF.

In some implementations, the switches Q1 and Q2 can be silicon carbide MOSFETs. In silicon carbide MOSFETs, the system loss can be relatively low to begin with. A semiconductor switching device based on a silicon carbide substrate can be more sensitive to switching losses such as those occurring when the switch that is being turned OFF has forward current. Using silicon carbide MOSFETs can make the power stage (e.g., an inverter) more efficient, but at light operating loads the power stage can reach a plateau on power losses. Providing a dynamic dead time can help in those and/or other situations. For example, the loss at light loads is almost entirely switching losses, and the present subject matter can reduce switching losses. In some implementations, a powerful electrical machine (e.g., an electric car) may have a powerful inverter that often is running at only 10% or less of its output capability. Accordingly, the performance at such relatively light loads can be important for the overall efficiency and can be improved by the present subject matter.

While some examples herein describe use of a three-phase inverter with silicon carbide MOSFETs, other types of power stages can be used. In some implementations, the power stages can form an inverter using IGBTs or silicon MOSFETs. As another example, the power stage can instead be a converter or other power supply.

Figure 5A:
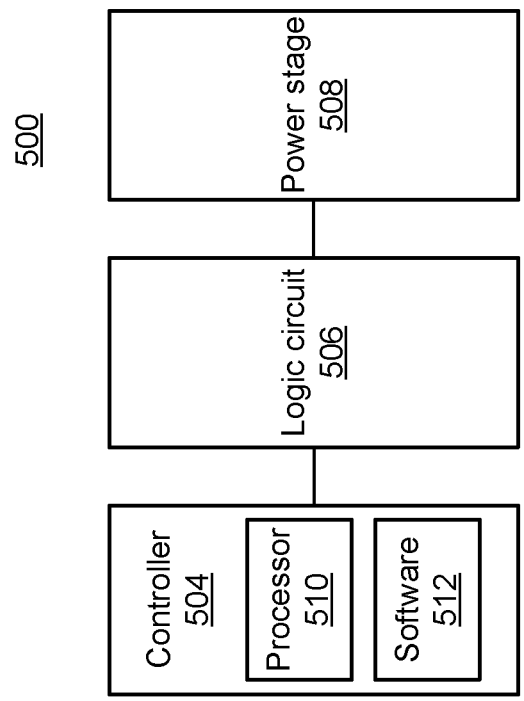
FIGS. 5A-5B show examples of systems for providing dead time to a power stage.
Figure 5B:
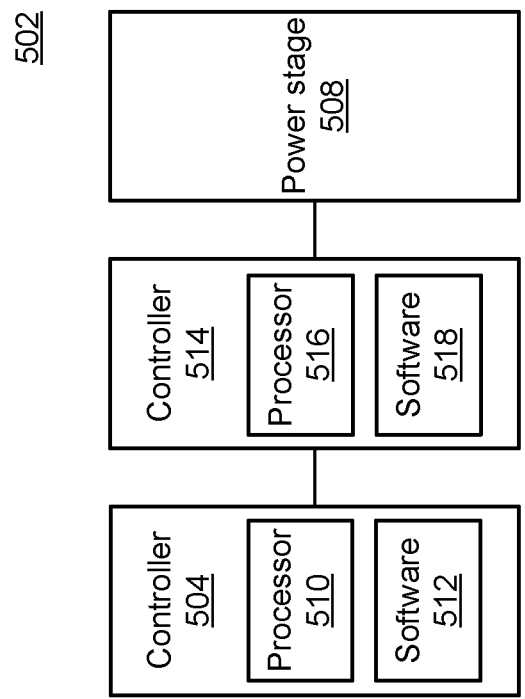

FIGS. 5A-5B show examples of systems 500 and 502 for providing dead time to a power stage. The systems 500 and 502 can be used with one or more other examples described elsewhere herein. The systems 500 and 502 illustrate some possible approaches for controlling a switch in a way that reduces power losses.

In FIG. 5A, the system 500 includes a controller 504, a logic circuit 506, and a power stage 508. For example, the controller 504 and the logic circuit 506 can form the controller 104 (FIG. 1). As another example, the power stage 508 can be one of the half-bridge power stages 110A-110C (FIG. 1).

The controller 504 can include a processor 510 (including, but not limited to, a microprocessor) that is configured to access machine-readable instructions stored in software 512 and perform operations accordingly. In some implementations, the controller 504 is a motor controller for a drive unit of an electric vehicle. In operation, the controller 504 can receive inputs that allow it to monitor aspects relating to the power stage 508, including, but not limited to, current level, voltage level, and the requested torque for the power stage 508. The controller 504 can output, on a cycle-by-cycle basis, PWM signals suitable for controlling the power stage 508. In some implementations, the PWM signals generated by the controller 504 can have fixed dead times.

The logic circuit 506 is separate from the controller 504 in this example. In some implementations, the logic circuit 506 includes an arrangement of logic gates configured to perform its function(s). For example, the logic circuit 506 can include an FPGA. In some implementations, the logic circuit 506 can be used as a complement to some of the functionality or operations performed by the controller 504. For example, safety restrictions can be evaluated and enforced using the logic circuit 506. As another example, the logic circuit 506 can be configured for synthesizing what the switches Q2, Q4, and Q6 (FIG. 1) should be doing, and inserting dead times in the PWM signals for the switches. That is, the logic circuit 506 can determine dynamic dead time and apply the dynamic dead time to the power stage 508. The logic circuit 506 can monitor system current, voltage, and voltage direction. Based on its inputs, the logic circuit 506 can compute and apply the proper dead time (e.g., a dynamic dead time) for the switching event. Using the logic circuit 506 can reduce the computational overhead of the controller 504. For example, such computational overhead can be substantial if dynamic dead time values are calculated for each of multiple half-bridge power stages at intervals on the order of microseconds (e.g., when an inverter operates at a rate on the order of multiple kilohertz).

The logic circuit 506 can use a lookup table in determining dynamic dead time. In some implementations, the lookup table can have dimensions of voltage by current. For example, the table can cover n voltage bins with regard to m current bins, where n and m are integers. The following Table 2 is an example of a lookup table for illustrative purposes only that uses 5 voltage bins and 16 current bins:

TABLE 2

Dynamic dead times (nanoseconds)

| Current | Voltage | | | | |
| --- | --- | --- | --- | --- | --- |
| | 000-647 V | 648-728 V | 729-808 V | 809-889 V | 890-924 V |
| 0-8 A | 1800 | 1800 | 1800 | 1800 | 1800 |
| 8-16 A | 1340 | 1420 | 1480 | 1580 | 1620 |
| 16-24 A | 740 | 780 | 820 | 880 | 900 |
| 24-33 A | 560 | 580 | 620 | 640 | 660 |
| 33-41 A | 460 | 480 | 500 | 520 | 540 |
| 41-43 A | 400 | 420 | 440 | 460 | 480 |
| 43-57 A | 360 | 380 | 400 | 400 | 420 |
| 57-65 A | 340 | 360 | 360 | 380 | 380 |
| 65-73 A | 320 | 340 | 340 | 340 | 360 |
| 73-81 A | 300 | 320 | 320 | 320 | 340 |
| 81-90 A | 280 | 300 | 300 | 320 | 320 |
| 90-98 A | 280 | 280 | 300 | 300 | 300 |
| 98-106 A | 260 | 280 | 280 | 300 | 300 |
| 106-114 A | 260 | 260 | 280 | 280 | 280 |
| 114-122 A | 240 | 260 | 260 | 260 | 260 |
| 122 A+ | 240 | 240 | 240 | 240 | 240 |

The values in Table 2 can provide soft switching at each of the applicable switching events. Other dynamic dead times than the values in Table 2 above can be used. The values of the dynamic dead times can depend on any or all of multiple factors, including, but not limited to, the size of the switches (e.g., MOSFETs), the power of the power stage (e.g., an inverter), and the voltages used.

The logic circuit 506 can evaluate the direction of current to determine whether a dynamic dead time should be applied. If the switch that is being turned OFF has a reverse current, the logic circuit 506 can determine that a minimal fixed dead time should be applied. For example, this can be the length of the dead time in the PWM signal received from the controller 504 and the logic circuit 506 may not need to modify the PWM signal in this case. On the other hand, if the switch that is being turned OFF has a forward current, the logic circuit 506 can determine that a dynamic dead time should be applied. The logic circuit 506 can then access a lookup table (e.g., the Table 2 above) based on the present levels of current and voltage. The logic circuit 506 can modify the PWM signal to provide a dynamic dead time of a length according to the lookup table. This modified PWM signal is provided to the power stage 508.

The logic circuit 506 (e.g., an FPGA) can monitor current (e.g., for performing another task that it is programmed to do) using a chip that measures voltage across a shunt (resistor). For example, this approach can require a digital filter, which may be part of the logic circuit 506. In some implementations, another current sensor can be used, including, but not limited to, a Hall effect current sensor that outputs a signal to the controller 504 (e.g., directly to the processor 510).

While the examples just described used logic devices (e.g., an FPGA) to modify PWM signals to provide a dynamic dead time, other approaches can be used. With a processor that has sufficient computational capacity, the functionality of providing dynamic dead time can be controlled by software. In FIG. 5B, the system 502 includes the controller 504, a controller 514, and the power stage 508. The controller 514 can include a processor 516 (including, but not limited to, a microprocessor) that is configured to access machine-readable instructions stored in software 518 and perform operations accordingly. The controllers 504 and 514 can collectively form the controller 104 (FIG. 1). In some implementations, controllers 504 and 514 can be implemented as a single controller (e.g., to serve as the motor controller of the drive unit in an electric vehicle). Here, the controllers 504 and 514 are shown as separate devices for simplicity.

The software 518 can control the dynamic dead time using any of multiple approaches. In some implementations, the software 518 can include instructions for ascertaining whether the switch that is being turned off has a reverse current, and if so the software 518 can access a lookup table to read the applicable dynamic dead time to be applied. For example, Table 2 above can be used.

In some implementations, instead of using a lookup table, the software 518 can compute a polynomial to determine the applicable dynamic dead time. This can facilitate implementation of a smooth function for providing the dynamic dead time. Generally, a polynomial T for dynamic dead time can be expressed as:

$$T(I,V)=a_0+a_1I+a_2V+a_3I^2+a_4IV+a_5V^2+\ldots,$$

where I is the current, V is the voltage, and $a_n$ (n=0, 1, 2, . . . ) are coefficients that can be selected based on the characteristics of the particular implementation. The polynomial T can include as many or as few terms involving I and/or V as necessary. Other approaches can be used.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A half-bridge power supply comprising:
   a first switch electrically connected to an energy source and to a load;
   a second switch electrically connected to the energy source and to the load;
   circuitry electrically connected to the first and second switches and configured to provide a dynamic dead time for the half-bridge power supply based on one of the first and second switches being turned off having forward current; and
   a controller electrically connected to the circuitry, the controller including a first processor.

2. The half-bridge power supply of claim 1, wherein at least one of the first and second switches comprises a silicon carbide MOSFET.

3. The half-bridge power supply of claim 1, wherein at least one of the first and second switches comprises an IGBT.

4. The half-bridge power supply of claim 1, wherein at least one of the first and second switches comprises a silicon MOSFET.

5. The half-bridge power supply of claim 1, wherein the half-bridge power supply comprises an inverter.

6. The half-bridge power supply of claim 1, wherein the circuitry comprises a logic circuit electrically connected to the controller.

7. The half-bridge power supply of claim 6, wherein the logic circuit comprises a field-programmable gate array.

8. The half-bridge power supply of claim 1, wherein the circuitry comprises a second processor executing software, wherein the software defines the dynamic dead time.

9. The half-bridge power supply of claim 8, wherein the second processor is the first processor.

10. The half-bridge power supply of claim 1, wherein the circuitry is configured to provide the dynamic dead time by controlling a pulse width modulation scheme for the first and second switches.

11. A half-bridge power supply comprising:
a first switch electrically connected to an energy source and to a load;
a second switch electrically connected to the energy source and to the load; and
circuitry electrically connected to the first and second switches and configured to provide a dynamic dead time for the half-bridge power supply based on one of the first and second switches being turned off having forward current;
wherein the circuitry is configured to obtain the dynamic dead time from a lookup table.

12. The half-bridge power supply of claim 11, wherein the lookup table includes different dynamic dead times associated with respective voltages and currents.

13. A half-bridge power supply comprising:
a first switch electrically connected to an energy source and to a load;
a second switch electrically connected to the energy source and to the load; and
circuitry electrically connected to the first and second switches and configured to provide a dynamic dead time for the half-bridge power supply based on one of the first and second switches being turned off having forward current;
wherein the circuitry is configured to obtain the dynamic dead time using a polynomial based on at least current.

14. A half-bridge power supply comprising:
a first switch electrically connected to an energy source and to a load;
a second switch electrically connected to the energy source and to the load; and
circuitry electrically connected to the first and second switches and configured to provide a dynamic dead time for the half-bridge power supply based on one of the first and second switches being turned off having forward current;
wherein the circuitry is configured to provide a fixed dead time for the half-bridge power supply based on the one of the first and second switches being turned off having reverse current.

15. A half-bridge power supply comprising:
a first switch electrically connected to an energy source and to a load;
a second switch electrically connected to the energy source and to the load; and
means for obtaining a dynamic dead time from a lookup table and providing the dynamic dead time for the half-bridge power supply based on one of the first and second switches being turned off having forward current.

16. A system comprising:
an energy source;
a motor;
a first half-bridge, the first half-bridge comprising:
a first switch electrically connected to the energy source and to the motor;
a second switch electrically connected to the energy source and to the motor; and
first circuitry electrically connected to the first and second switches and configured to provide a dynamic dead time for the first half-bridge based on one of the first and second switches being turned off having forward current; and
a controller electrically connected to the first circuitry, the controller including a processor.

17. The system of claim 16, wherein the motor includes a first phase winding, a second phase winding, and a third phase winding, wherein the first half-bridge is electrically connected to the first phase winding, the system further comprising:
a second half-bridge, the second half-bridge electrically connected to the second phase winding and comprising:
a third switch electrically connected to the energy source and to the motor;
a fourth switch electrically connected to the energy source and to the motor; and
second circuitry electrically connected to the third and fourth switches and configured to provide a dynamic dead time for the second half-bridge based on one of the third and fourth switches being turned off having forward current; and
a third half-bridge, the third half-bridge electrically connected to the third phase winding and comprising:
a fifth switch electrically connected to the energy source and to the motor;
a sixth switch electrically connected to the energy source and to the motor; and
third circuitry electrically connected to the fifth and sixth switches and configured to provide a dynamic dead time for the third half-bridge based on one of the fifth and sixth switches being turned off having forward current.

18. The system of claim 17, wherein the first, second, and third circuitries are included in a common logic circuit.

19. The system of claim 17, wherein the first, second, and third circuitries are formed by the processor by executing software.

* * * * *

UNITED STATES PATENT AND TRADEMARK OFFICE
CERTIFICATE OF CORRECTION

| | | |
|---|---|---|
| PATENT NO. | : 11,658,563 B2 | Page 1 of 1 |
| APPLICATION NO. | : 17/304149 | |
| DATED | : May 23, 2023 | |
| INVENTOR(S) | : Biskup et al. | |

It is certified that error appears in the above-identified patent and that said Letters Patent is hereby corrected as shown below:

On the Title Page

Column 2, Item (56), under "OTHER PUBLICATIONS", Line 2, delete "Sep. 3," and insert -- Sep. 6, --, therefor.

Signed and Sealed this
First Day of August, 2023

Katherine Kelly Vidal
*Director of the United States Patent and Trademark Office*